(12) United States Patent
Xu et al.

(10) Patent No.: US 9,966,830 B2
(45) Date of Patent: May 8, 2018

(54) VIBRATION MOTOR

(71) Applicants: Hongfu Xu, Shenzhen (CN); Zhilin Chai, Shenzhen (CN); Na Wu, Shenzhen (CN)

(72) Inventors: Hongfu Xu, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 362 days.

(21) Appl. No.: 15/011,491

(22) Filed: Jan. 30, 2016

(65) Prior Publication Data

US 2017/0012513 A1    Jan. 12, 2017

(30) Foreign Application Priority Data

Jul. 8, 2015   (CN) .......................... 2015 1 0397499

(51) Int. Cl.
  *H02K 33/16*    (2006.01)
  *H02K 41/035*   (2006.01)

(52) U.S. Cl.
  CPC ......... *H02K 41/0356* (2013.01); *H02K 33/16* (2013.01)

(58) Field of Classification Search
  CPC .......................................... H02K 33/00–33/18
  See application file for complete search history.

(56) References Cited

U.S. PATENT DOCUMENTS

2011/0018365 A1*   1/2011   Kim .................... B06B 1/045
                                                        310/17

* cited by examiner

*Primary Examiner* — Ramon M Barrera
(74) *Attorney, Agent, or Firm* — Na Xu; IPro, PLLC

(57) ABSTRACT

A vibration motor is provided in the present disclosure. The vibration motor includes a stationary part, a vibration part and an elastic connector. The stationary part includes a housing providing an accommodating space. The vibration part is suspended within the accommodating space by the elastic connector. The stationary part includes a coil, and the vibration part includes a first magnet set and a second magnet set. The first magnet set and the second magnet set are respectively disposed at two opposite sides of the coil for generating a closed magnetic loop. The first magnet set comprises a first left magnet and a first right magnet spaced apart from each other, and the second magnet set comprises a second left magnet and a second right magnet spaced apart from each other.

20 Claims, 4 Drawing Sheets

VIBRATION MOTOR

FIELD OF THE DISCLOSURE

The present disclosure relates to vibration motor technologies, and more particularly, to a vibration motor applicable to a mobile device.

BACKGROUND

With development of mobile electronic technology, mobile devices, such as mobile phones, handheld game players, navigation devices, handheld multimedia entertainment apparatuses, or the like, become more and more popular. Generally, the mobile devices use vibration motors to provide system feedback, such as incoming call or message prompting in a mobile phone, or vibration feedback in a potable game player.

In a related vibration motor, a magnet is provided at one side of a coil; however, the one-side magnet configuration may causes a magnetic field in the vibration motor to be divergent when the vibration motor operates, and thus an intensity of the magnetic field is too weak to generate sufficient driving force for vibration. Accordingly, the vibration motor may be incapable for providing good system feedback for the mobile device.

Therefore, it is desired to provide a vibration motor which can overcome the aforesaid problems.

BRIEF DESCRIPTION OF THE DRAWINGS

To describe the technical solutions of embodiments of the present disclosure more clearly, the attached drawings necessary for description of the embodiments will be introduced briefly hereinbelow. Obviously, these attached drawings only illustrate some of the embodiments of the present disclosure, and those of ordinary skill in the art can further obtain other attached drawings according to these attached drawings without making inventive efforts.

DETAILED DESCRIPTION

The present disclosure will be described in detail below with reference to the attached drawings and the embodiment thereof.

Figure 1:
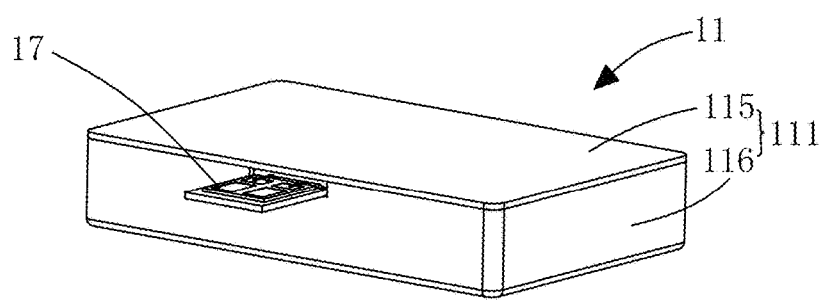
FIG. 1 is a schematic assembled view of a vibration motor according to an embodiment of the present disclosure.
Figure 2:
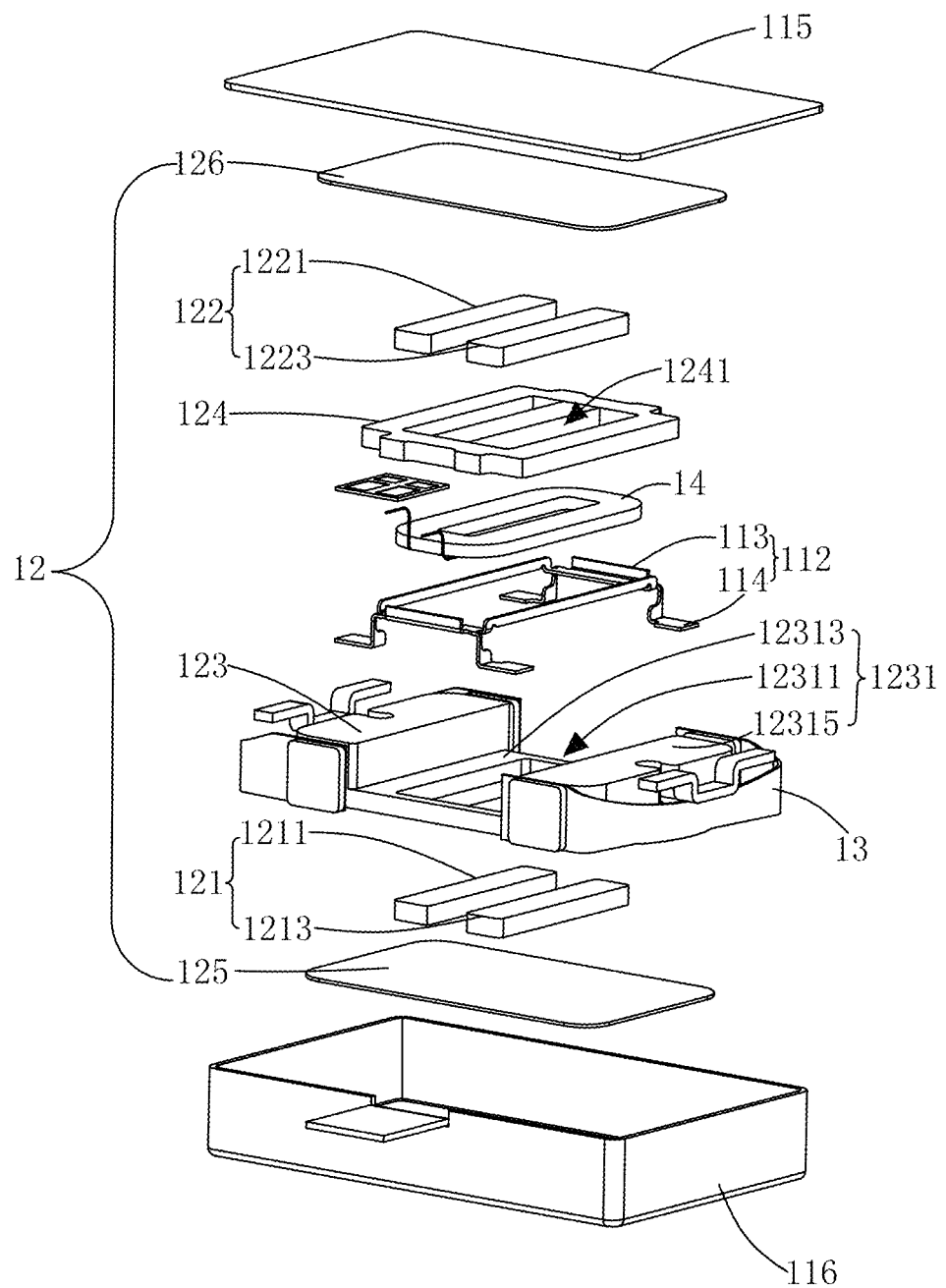
FIG. 2 is an exploded view of the vibration motor of FIG. 1.
Figure 3:
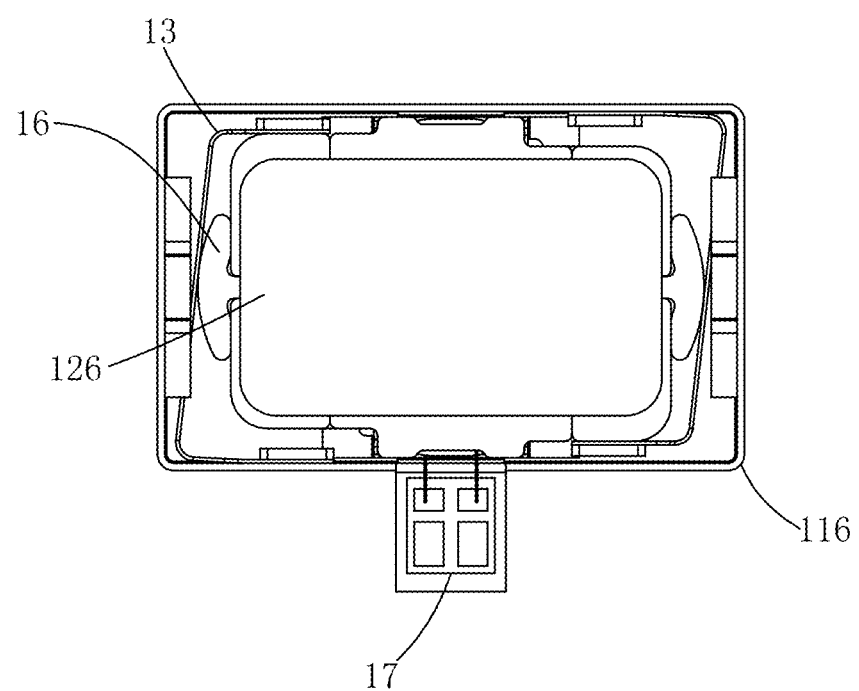
FIG. 3 is a partial top view of the vibration motor of FIG. 1.

Referring to FIGS. 1-3, a vibration motor 1 according to an embodiment of the present disclosure is illustrated. The vibration motor 1 includes a stationary part 11, a vibration part 12, and an elastic connector 13. The stationary part 11 includes a housing 111, and the housing 111 includes a top cover 115 and a casing 116. The top cover 115 covers the casing 116 for forming an accommodating space. The vibration part 12 is suspended within the accommodating space by the elastic connector 13.

The vibration part 12 includes a first mass block 123, a first magnet set 121 accommodated within the first mass block 123, a second mass block 124, a second magnet set 122 accommodated within the second mass block 124, a first pole plate 125 adjacent to the first mass block 123, and a second pole plate 126 adjacent to the second mass block 124.

The first magnet set 121 includes a first left magnet 1211 and a first right magnet 1213 that are spaced apart from each other. The second magnet set 122 includes a second left magnet 1221 and a second right magnet 1223 that are spaced apart from each other.

The first mass block 123 has a groove 1231 formed at a central of a main body thereof, the groove 1231 may be cooperatively formed by a bottom 12313 and two sidewalls 12315 extending from two opposite sides of the bottom 12313. The bottom 12313 includes two first through holes 12311 which are spaced apart from each other, and the two first through holes 12311 may be elongated and are parallel to each other. The first left magnet 1211 and the first right magnet 1213 are respectively received within the two first through holes 12311, and the first pole plate 125 is attached to a surface of the bottom 12313 that is away from the second mass block 124.

The second mass block 124 is placed in the groove 1231 and between the two sidewalls 12315, and is separated from the bottom 12311 at a certain distance. The second mass block 124 includes two second through holes 1241 which are spaced apart from each other, and the two second through holes 1231 may also be elongated and are parallel to each other. The second pole plate 126 is attached to a surface of the second mass block 124 that is away from the bottom 12313, and the second left magnet 1221 and the second right magnet 1223 are respectively received within the two second through holes 1241. In the present embodiment, the first mass block 123 and the second mass block 124 are two separate components; alternatively, the first mass block 123 and the second mass block 124 may be formed integrally into a one-piece component.

The elastic connector 13 includes a pair of U-shaped elastic connecting members for suspending the two ends of the first mass block 123 in the housing 111 respectively. Specifically, each of the U-shaped elastic connecting members has a first end connected to the housing 111, and a second end connected to a corresponding end of the first mass block 123.

The stationary part 11 further includes a coil 14 and a coil support 112 fixed within the housing 111. The coil support 112 includes a supporting portion 113 for supporting the coil 14, and extending legs 114 bent and extending from the supporting portion 113. The extending legs 114 may be further connected to the casing 116, and the supporting portion 113 is positioned between the first mass block 123 and the second mass block 124.

Furthermore, the vibration motor 1 further includes a pair of dampers 16 and a flexible printed circuit board 17. Each of the dampers 16 is positioned between one of U-shaped elastic connecting members of the elastic connector 13 and a corresponding end of the first mass block 123. The flexible printed circuit board 17 is placed on an extending platform which extends outwards form the casing 116, and is electrically connected with the coil 14.

Figure 4:
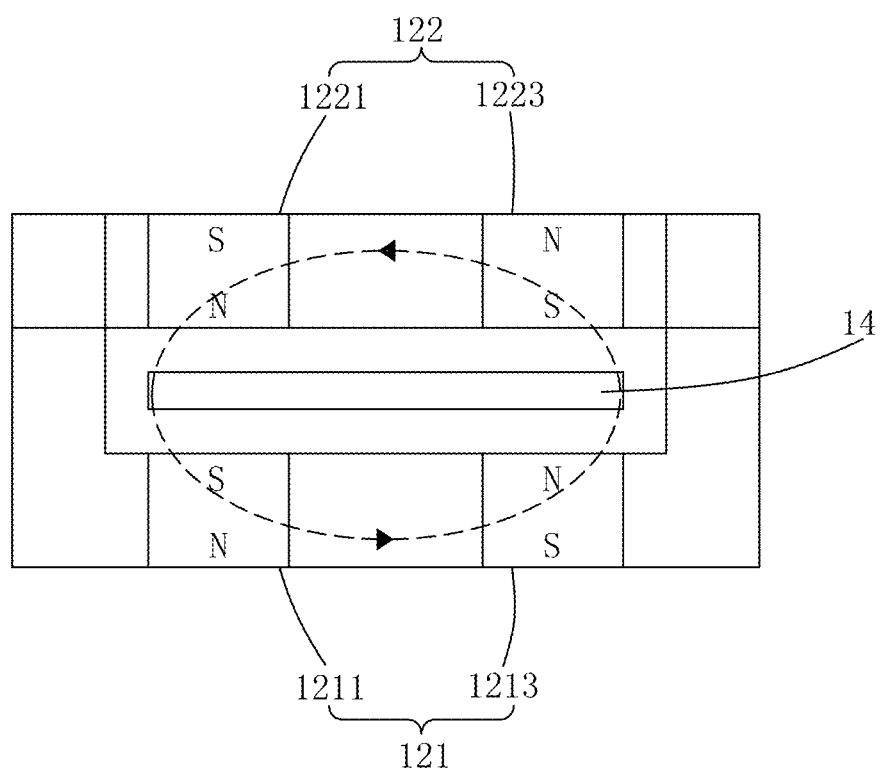
FIG. 4 schematically illustrates a magnetic induction line in the vibration motor of FIG. 1.

Referring also to FIG. 4, the first magnet set 121 and the second magnet set 122 are respectively disposed at two sides and opposite to the coil 14 for forming a closed magnetic loop.

Specifically, the first left magnet 1211 and the second left magnet 1221 are arranged perpendicular and at two opposite sides of the coil 14 with a same magnetized direction. The first right magnet 1213 and the second right magnet 1223 are also arranged perpendicular and at two opposite sides of the coil 14 with a same magnetized direction. Furthermore, a magnetized direction of the first left magnet 1211 is opposite to that of the first right magnet 1213, and a magnetized direction of the second left magnet 1221 is opposite to that of the second right magnet 1223. With the above configuration, a magnetic field generated by the first magnet set 121 and the second magnet set 122 can be ensured to form a closed magnetic loop.

For example, as illustrated in FIG. 4, an N-pole end of the first left magnet 1211 and an S-pole end of the second left magnet 1221 are both opposite to the coil 14, while an S-pole end of the first left magnet 1211 and an N-pole end of the second left magnet 1221 both face the coil 14. In contrast, an S-pole end of the first right magnet 1213 and an N-pole end of the second right magnet 1223 are both opposite to the coil 14, while an N-pole end of the first right magnet 1213 and an S-pole end of the second right magnet 1223 both face the coil 14. As such, the first left magnet 1211, the first right magnet 1213, the second right magnet 1223 and the second left magnet 1221 cooperatively form a closed magnetic loop.

When the vibration motor 1 operates, the coil 14 is provided with a current signal via the flexible printed circuit board 17 to generate a magnetic field, and the magnet field provides a magnetic force upon the first magnet set 121 and the second magnet set 122. A direction of the current changes periodically, and a direction of the magnetic force acting upon the first magnet set 121 and the second magnet set 122 changes correspondingly, which drives the first mass block 123 and the second mass block 124 to perform reciprocating motion.

In the vibration motor 1 according to the present disclosure, two magnet sets 121 and 122 are disposed parallel to each other at two opposite sides of the coil 14 respectively, and the two magnet sets 121 and 122 work in cooperation with each other to ensure a magnetic field in the vibration motor 1 to form a closed magnetic loop. This increases an overall intensity of the magnetic field acting upon the coil 14, and thus the vibration motor can provide sufficient driving force to perform vibration feedback for a mobile device in which the vibration motor is applied.

While the present invention has been described with reference to the specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A vibration motor, comprising:
a stationary part comprising a housing providing an accommodating space;
an elastic connector; and
a vibration part suspended within the accommodating space by the elastic connector;
wherein the stationary part comprises a coil, and the vibration part comprises a first magnet set and a second magnet set; the first magnet set and the second magnet set are respectively disposed at two opposite sides of the coil for generating a closed magnetic loop; the first magnet set comprises a first left magnet and a first right magnet spaced apart from each other, and the second magnet set comprises a second left magnet and a second right magnet spaced apart from each other.

2. The vibration motor of claim 1, wherein the first left magnet and the second left magnet are arranged perpendicular to and at two opposite sides of the coil with a same magnetized direction,; the first right magnet and the second right magnet are also arranged perpendicular to and at two opposite sides of the coil with a same magnetized direction.

3. The vibration motor of claim 2, wherein the magnetized direction of the first left magnet is opposite to that of the first right magnet, and the magnetized direction of the second left magnet is opposite to that of the second right magnet.

4. The vibration motor of claim 1, wherein the vibration part further comprises a first mass block having a groove and a second mass block received in the groove.

5. The vibration motor of claim 4, wherein the groove is cooperatively formed by a bottom and two sidewalls extending from two opposite sides of the bottom, the bottom further comprises two first through holes spaced apart from each other for receiving the first left magnet and the first right magnet.

6. The vibration motor of claim 5, wherein the second mass block is separated from the bottom and forms two second through holes spaced apart from each other for accommodating the second left magnet and the second right magnet.

7. The vibration motor of claim 5, wherein the vibration part further comprises a first pole plate attached to a surface of the bottom that is away from the second mass block, and a second pole plate attached to a surface of the second mass block that is away from the bottom.

8. The vibration motor of claim 4, wherein the elastic connector comprises a pair of U-shaped elastic connecting members for suspending the two ends of the first mass block in the housing respectively.

9. The vibration motor of claim 4, wherein the first mass block and the second mass block are formed integrally into a one-piece component.

10. The vibration motor of claim 4, wherein the stationary part further comprises a coil support fixed within the housing, the coil support comprises a supporting portion for supporting the coil, and extending legs extending from the supporting portion and disposed in the housing; the supporting portion is positioned between the first mass block and the second mass block.

11. A vibration motor, comprising:
a housing;
a vibration part suspended in the housing, the vibration part comprising a first magnet set and a second magnet set; and
a coil supported in the housing;
wherein the first magnet set and the second magnet set are respectively disposed at two opposite sides of the coil for generating a closed magnetic loop; the first magnet set comprises a first left magnet and a first right magnet that are spaced apart from each other, and the second magnet set comprises a second left magnet and a second right magnet that are spaced apart from each other.

12. The vibration motor of claim 11, wherein the first left magnet and the second left magnet are arranged perpendicular to and at two opposite sides of the coil with a same magnetized direction; the first right magnet and the second right magnet are also arranged perpendicular to and at two opposite sides of the coil with a same magnetized direction.

13. The vibration motor of claim 12, wherein the magnetized direction of the first left magnet is opposite to that of the first right magnet, and the magnetized direction of the second left magnet is opposite to that of the second right magnet.

14. The vibration motor of claim 11, wherein the vibration part further comprises a first mass block having a groove and a second mass block received in the groove.

15. The vibration motor of claim 14, wherein the groove is cooperatively formed by a bottom and two sidewalls extending from two opposite sides of the bottom, the bottom further comprises two first through holes spaced apart from each other for receiving the first left magnet and the first right magnet.

16. The vibration motor of claim 15, wherein the second mass block is separated from the bottom and forms two second through holes spaced apart from each other for accommodating the second left magnet and the second right magnet.

17. The vibration motor of claim 15, wherein the vibration part further comprises a first pole plate attached to a surface of the bottom that is away from the second mass block, and a second pole plate attached to a surface of the second mass block that is away from the bottom.

18. The vibration motor of claim 14, wherein the elastic connector comprises a pair of U-shaped elastic connecting members for suspending the two ends of the first mass block in the housing respectively.

19. The vibration motor of claim 14, wherein the first mass block and the second mass block are formed integrally into a one-piece component.

20. The vibration motor of claim 14, further comprising a coil support fixed within the housing, wherein the coil support comprises a supporting portion for supporting the coil, and extending legs extending from the supporting portion and disposed in the housing; the supporting portion is positioned between the first mass block and the second mass block.

* * * * *